United States Patent [19]

Ohlendorf et al.

[11] Patent Number: 4,986,801

[45] Date of Patent: Jan. 22, 1991

[54] DEVICE FOR A RELATIVE ANGULAR ADJUSTMENT BETWEEN TWO SHAFTS CONNECTED TO ONE ANOTHER BY DRIVING MEANS

[75] Inventors: Rolf Ohlendorf, Weinstadt; Willy Treyz, Neckartailfingen; Wolfgang Speier, Tübingen, all of Fed. Rep. of Germany

[73] Assignee: Daimler-Benz AG, Fed. Rep. of Germany

[21] Appl. No.: 403,381

[22] Filed: Sep. 6, 1989

[30] Foreign Application Priority Data

Sep. 7, 1988 [DE] Fed. Rep. of Germany ....... 3830382

[51] Int. Cl.⁵ .................................................. F16H 1/32
[52] U.S. Cl. .................................... 475/331; 123/90.17
[58] Field of Search ............... 475/169, 170, 269, 296, 475/302, 331; 74/421 A, 421 R, 89.16; 123/90.15, 90.17, 90.31

[56] References Cited

U.S. PATENT DOCUMENTS

| | | | |
|---|---|---|---|
| 2,027,149 | 1/1936 | Christian | 74/421 A X |
| 2,320,379 | 6/1943 | Niekamp | 74/421 A |
| 3,364,774 | 1/1968 | Easton | 74/421 A |
| 3,978,829 | 9/1976 | Takahashi | 123/90.17 X |
| 4,421,074 | 12/1983 | Garrea et al. | 123/90.15 |
| 4,494,496 | 1/1985 | Nakamura et al. | 123/90.17 X |
| 4,535,731 | 8/1985 | Banfi | 123/90.17 X |
| 4,561,390 | 12/1985 | Nakamura et al. | 123/90.15 |
| 4,856,465 | 8/1989 | Denz et al. | 123/90.17 |
| 4,873,949 | 10/1989 | Fujiyashi et al. | 123/90.31 X |
| 4,895,113 | 1/1990 | Speier et al. | 123/90.31 X |

FOREIGN PATENT DOCUMENTS

| | | | |
|---|---|---|---|
| 340821 | 11/1989 | European Pat. Off. | 123/90.17 |
| 2126620 | 2/1982 | Fed. Rep. of Germany . | |
| 3342905 | 6/1985 | Fed. Rep. of Germany . | |
| 2120320 | 11/1983 | United Kingdom | 123/90.17 |

Primary Examiner—Dwight Diehl
Attorney, Agent, or Firm—Evenson, Wands, Edwards, Lenahan & McKeown

[57] ABSTRACT

An adjustable drive connection between an engine crankshaft and engine camshaft is provided by an electric motor connected to the camshaft via planetary gearing to cause relative rotation of an adjusting carrier in relation to a flanged shaft connected firmly to a camshaft. The carrier is fastened to this flanged shaft by means of a thread, so that its relative rotation with respect to the flange shaft is converted into an axial shafting of the carrier along the flange. An actuating element arranged on the carrier is likewise shifted axially. The axial shifting of the actuating element is converted into a relative rotation of the flanged shaft and a chain-wheel carrier driven by a crankshaft via helical teeth on the actuating element.

12 Claims, 1 Drawing Sheet

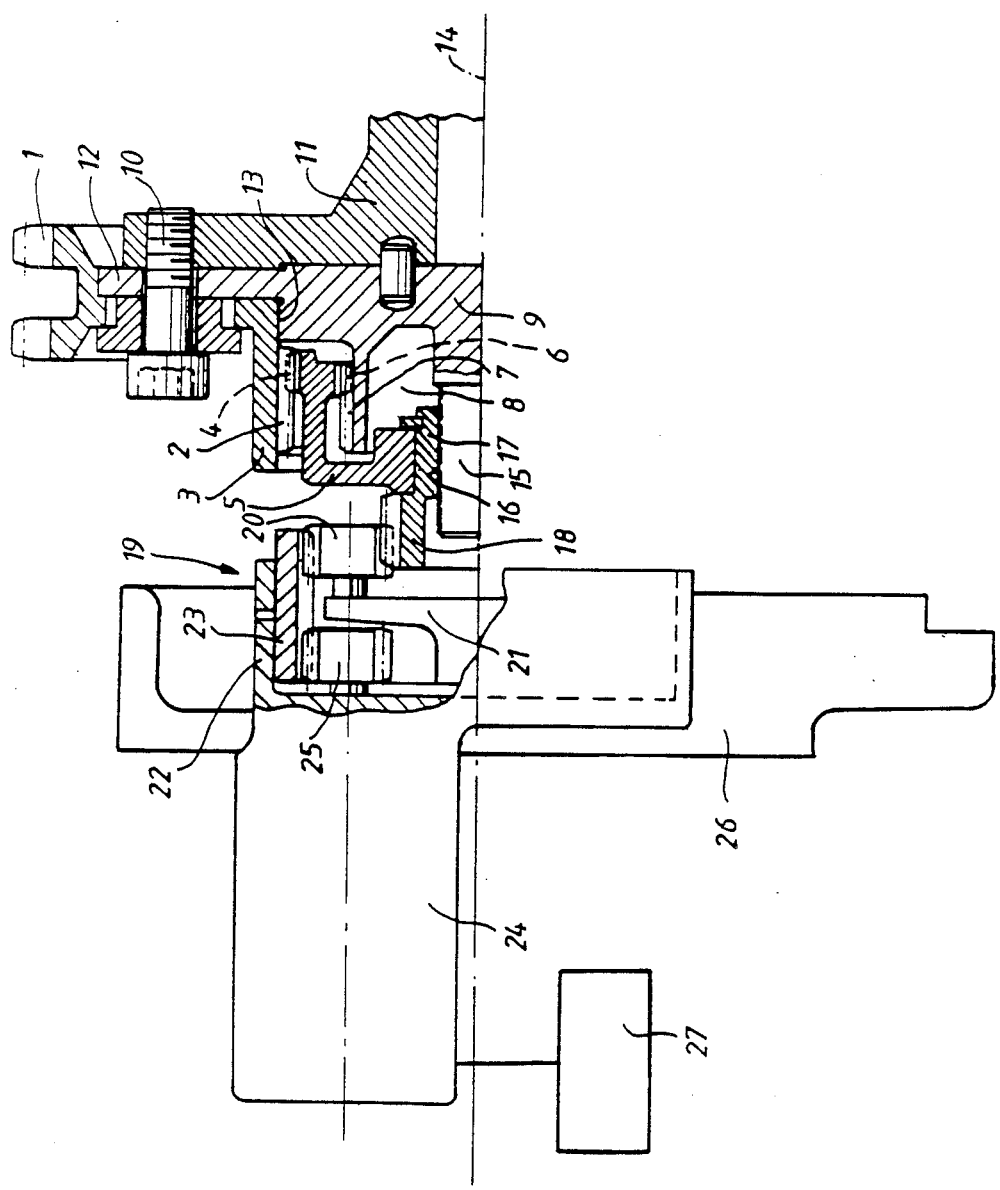

4,986,801

DEVICE FOR A RELATIVE ANGULAR ADJUSTMENT BETWEEN TWO SHAFTS CONNECTED TO ONE ANOTHER BY DRIVING MEANS

BACKGROUND AND SUMMARY OF THE INVENTION

The invention relates to a device for a relative angular adjustment between at least two shafts (especially a crankshaft and at least one camshaft) connected to one another in a driving relationship. The camshaft, at its end on the driving side, carries an actuating element which is axially shiftable on this end and is connected positively to it via a helical gear teeth set. The actuating element is connected axially shiftable and fixed rotatively to a cylindrical hollow shaft surrounding it via a further helical gear teeth set. The hollow shaft carries a driving wheel of the crankshaft.

German Offenlegungsschrift No. 3,126,620 shows a device for varying the phase setting between an engine shaft and a control shaft in engines having two separate shafts for controlling engine inlet valves and outlet valves. This device provides for alternating between two different drive control settings. Each of the two control settings corresponds to one end position of a movable drive member which is connected to an engine shaft and a control shaft via couplings. At least one coupling is equipped with a helical teeth and by an axial shaft, causes a rotation of the control shaft in relation to the engine shaft. The adjustment of the drive member into one of the end positions is obtained by means of the pre-stress of a spring, while the adjustment into the other end position takes place in response to the pressure of oil from the engine-oil circuit. A centrifugally actuated slide assumes three different positions as a function of the engine speed wherein it correspondingly opens and closes oil flow bypass bores and thereby controls the oil pressure to the drive member. One position of the slide opens an oil bypass bore, below a specific engine speed, whereupon only a spring force acts on the drive member to keep the drive member in an end position If the engine speed exceeds this first specific engine speed threshold value, the slide closes off the oil flow bypass bore as a result of the change of centrifugal force and the drive member is shifted axially into a second end position, counter to the spring stress, by means of the increasing engine-oil pressure. Here a relative rotation between the engine shaft and control shaft takes place and a control setting matched to this engine operating state is obtained thereby. After a further threshold value for the engine speed has been exceeded, the slide is moved into a position which once again allows an oil to flow bypass. The drive member is once more moved back into its first end position by means of the spring force and with a corresponding relative rotation. The adjustment of the drive member when the engine speed falls below the threshold values takes place in the same way.

The disadvantage of this device is that the control is carried out via the engine-oil circuit. At low engine speeds, for example during idling, the oil pressure is too low to be capable of causing an adjustment. Consequently, the drive member has to be brought into the position corresponding to this operating state by means of spring force. However, at a low engine speed and consequently a low oil pressure, such a spring force can prevent an adjustment of the drive member by means of pressure oil in the periods when there is an inhibiting camshaft torque, so that an adjustment can take place only during a driving camshaft torque, i.e. intermittently. To avoid the undesirable return of the drive member caused by the spring force together with the camshaft torque, the helical gear teeth must be made self-locking, i.e. with a low helix angle. Such a helix angle only allows for a short adjustment travel (i.e. the relative angular adjustment between the engine shaft and control shaft or camshaft) and therefore the variation of the control shaft is only slight.

Another disadvantage with such a device is that it is only possible to switch to and for between two end positions, although it is desirable to have the possibility of ensuring a continuous adjustment of the camshaft through many relative positions.

German Offenlegungsschrift No. 3,342,905 shows a device for a relative angular adjustment between two shafts connected to one another in driving terms. The device consists of two planetary gears which are arranged in a housing and the sun wheels of which are connected respectively to the drive shaft and to the output shaft. The torque transmission takes place via the planet wheels. The ring wheel of the planetary gear connected to the output shaft is connected fixedly in terms of rotation to the housing, while the ring wheel of the planetary gear located on the drive side can be rotated in the two directions of rotation by means of a stepping motor. During normal operation, this ring wheel is restrained and there is a synchronous movement of drive and output. For a relative angular adjustment between drive shaft and the output shaft, the ring wheel located on the drive side is rotated in one direction or the other by means of the stepping motor and a leading or trailing movement of the output shaft in relation to the drive shaft is thus obtained.

A device of this type is used, for example, in spray adjusters for diesel injection pumps. However, if it were to be used as camshaft adjuster to vary the control times of the inlet and outlet valves of internal-combustion engines, high restoring torques would occur. In such a device these torques would lead to problems with the gear teeth sets.

The object of the invention is to design an adjusting device in such a way that a continuous angular adjustment of the camshaft over a wide adjustment range can be obtained quickly and reliably.

According to the invention, the object is achieved by having an actuating element arranged freely rotatable and fixed axially on a carrier connected to the camshaft via a clamping thread and by having the carrier connected to an electric motor via a transmission means.

It is desirable that the transmission means consist of a planetary gear set, wherein the carrier forms the sun wheel of the planetary gear set. The planet wheels are arranged on a planet-wheel carrier fixedly connected in terms of rotation to the housing of the planetary gear, and the ring wheel is arranged freely rotatably in the housing of the planetary gear. The electric motor is in engagement with a ring wheel via a gear wheel fastened on its shaft.

A chain wheel is arranged on a chain-wheel carrier designed as a hollow shaft and having inner helical gear teeth and is driven by the crankshaft via a chain connection. An actuating element equipped with corresponding outer helical gear teeth is guided axially movably in the chain-wheel carrier. This actuating element is connected via inner helical gear teeth to be axially shiftably on an outer helical gear teeth surface of a flanged shaft connected firmly to the camshaft of the engine at an annular space. A carrier is mounted, via a clamping thread, to be axially shiftable on the inner part of the flanged shaft as a result of rotation. The carrier is arranged in line with the camshaft axis and receives the actuating element freely rotatable on its circumference. This carrier is connected to an electric motor via a gear.

During the normal operation of the adjusting device, that is to say in the periods when there is no relative rotation between the chain-wheel carrier and camshaft, these two shafts are connected to one another via the helical gear teeth of the actuating element and have an identical rotational speed. The carrier mounted on the inner part of the flanged shaft and receiving the actuating element, likewise has the same rotational speed because of its clamping-thread connection and transmits this rotational speed, stepped up via the gear, to rotate an electric motor.

When the electric motor is operated at a rotational speed higher or lower than this rotational speed as determined by the camshaft, it rotates the carrier arranged on the flanged shaft and thereby causes an axial shift of this carrier and of the actuating element rotatable on it. This axial shift of the actuating element gives rise to a relative rotation between the chain-wheel carrier and camshaft because of the helical gear teeth drive, and consequently to a variation of the valve control times. Accordingly, if the electric motor is operated at a higher or lower speed in relation to its speed occurring during normal operation, there is a leading or retarding adjustment of the camshaft in relation to the chain-wheel carrier, i.e. to the crankshaft. The adjusting device thus makes it possible to obtain, as a function of the speed change of the electric motor, a continuous relative rotation between crankshaft and camshaft independently of the speed range in which these shafts are operated.

Other objects, advantages and novel features of the present invention will become apparent from the following detailed description of the invention when considered in conjunction with the accompanying drawings.

BRIEF DESCRIPTION OF THE DRAWINGS

FIG. 1 shows a cross-sectional view of the adjusting device.

DETAILED DESCRIPTION OF THE DRAWINGS

The FIGURE shows an adjusting device in which a crankshaft (not shown) drives a chain wheel 1 via a chain (not shown). The chain wheel 1 rests on a chain-wheel carrier 3, which is designed as a hollow shaft and is equipped with inner helical gear teeth 2. An annular axially shiftably actuating element 5 is arranged in the hollow of the chain-wheel carrier 3 and rotatable via corresponding outer helical gear teeth 4 on the chain wheel-carrier 3. The actuating element 5 has helical gear teeth 6 on its inner face, via which it is rotatably and positively connected, while being axially shiftable with respect to a flanged shaft 9 via outer helical teeth 7. This flanged shaft 9 forms an annular space 8 and is itself fixedly fastened in terms of rotation to a camshaft 11 via a screw connection 10. The chain-wheel carrier 3 is rotatably supported on flanged shaft 9 end 13, located on the same side as the camshaft and abuts flange portion 12. An axial shift of the actuating element 5 causes the two helical gear teeth sets 2, 4 and 6, 7 to provide a relative rotation of the flanged shaft 9 and firmly connected camshaft 11 in relation to the chain-wheel carrier 3 and its chain wheel 1, i.e. in relation to the crankshaft. The division of the helical gear teeth (into the two helical gear teeth 2, 4 and 6, 7 shown here) allows a reduction of the helix angle of each of the individual helical teeth, while at the same time ensuring a constant adjustment travel. Thus, a wide range of angular adjustment can be obtained with a short axial adjustment travel. This fact makes it possible to achieve a short space-saving design of the adjusting device.

Advantageously, the helix angles of the two helical gear teeth sets 2, 4 and 6, 7 are identical, thereby allowing production via a single tool in the same chuck fixture. This makes it possible to ensure quicker production, while at the same time ensuring increased concentricity.

A carrier 17 is arranged on end 15 of the flanged shaft 9, which faces away from the camshaft 11, and is aligned with the camshaft axis 14. The carrier 17 helps close off the annular space 8 and is fastened like a nut to clamping thread 16. Rotation of carrier 7 causes it to advance (or recede) along the end 15 of the flange 9 to axially shift the actuating element 5, mounted rotatably on the carrier 17. This carrier 17 is normally held in its axial position by the clamping thread 16 and rotated with end 15 of flanged shaft 9 at the same rotational speed as the camshaft 11, which is fixedly connected in terms of rotation to the flanged shaft 9 and with the chain-wheel carrier 3 connected to the flanged shaft 9 via the helical gear teeth set 2, 4 and 6, 7. The side of the carrier 17 facing away from the camshaft 11 is designed as a sun wheel 18 of planetary gearing 19. The sun wheel 18 interacts with the planet wheel 20 of a planet-wheel set arranged on the planet-wheel carrier 21 and which is itself in engagement with a ring wheel 23 which is freely rotatable in the housing 22 of the planetary gearing 19. The rotational movement of the sun wheel 18 is transmitted, via the planet-wheel set, to the freely rotating ring wheel 23 which in turn drives an electric motor 24, which is fastened to a housing 22, via gear wheel 25 located on the motor shaft. The housing 22 of the planetary gearing 19, together with the electric motor 24, is attached to a part 26 fixed to the machine.

In the periods when there is to be no relative rotation between the chain-wheel carrier 3 and the camshaft 11, the camshaft 11 drives the electric motor 24 via the planetary gearing 19 at a speed determined by the step-up ratio of the planetary gear 19.

To bring about an adjusting movement, the electric motor 24 is activated via a control unit 27 in such a way that its speed differs form the speed predetermined by the camshaft 11 and the planetary gearing 19. This speed difference is transmitted from the gear wheel 25, via the ring wheel 23 and the planet wheels 20 supported on the planet-wheel carrier 21, to the sun wheel 18 on the carrier 17 which causes the carrier to shift axially on the threads 16 on end 15 of camshaft 11, as a result of its relative rotation in relation to camshaft 11 rotation. By means of this axial shifting, the actuating element 5, arranged rotatably on the carrier 17, is likewise necessarily shifted axially and thus causes the desired relative rotative between the chain-wheel carrier 3 and flanged shaft 9 via the helical gear teeth set 2, 4 and 6, 7. This adjusts the relative position between the crankshaft and the camshaft 11.

The direction of rotation depends on whether the electric motor 24 is driven at a speed higher or lower than that determined by the camshaft 11 and the planetary gear 19.

The drive by an electric motor guarantees a reliable adjustment over the entire operating range, since in contrast to otherwise conventional adjusting devices, the adjustment works independently of engine-oil pressure. This also allows for the power of an engine-oil pump to be kept low, thereby saving weight and cost. Furthermore, the adjustment, that is to say the relative rotation of the camshaft 11 in relation to the crankshaft, is not restricted to two or more indexed or fixed positions, but can take place continuously over the entire speed range of an internal-combustion engine in a simple way, under the influence of the control unit 27. The best possible control times for the valves of the internal-combustion engine can thereby be provided for each operating point.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for a relative angular adjustment between two shafts drivingly connected to one another;
   one shaft carries an actuating element at its end, which actuating element is axially shiftable on this end and is connected positively to the end via a helical gear teeth set;
   said actuating element is connected to a cylindrical hollow shaft surrounding the actuating element in an axially shiftably and positive driven manner by a further helical gear test set;
   the cylindrical hollow shaft carries a driving wheel connected to the other shaft;
   the actuating element is freely rotatably and axially fixed to a carrier connected to the one shaft via a clamping thread; and wherein
   the carrier is connected to the one shaft rotatably driven by an electric motor via a transmission means.

2. A device according to claim 1, wherein the transmission means is a planetary gear set.

3. A device according to claim 2, wherein a ring wheel of the planetary gear set is arranged to be freely rotatably in the housing.

4. A device according to claim 2, wherein the electric motor is in engagement with the ring wheel of the planetary gear set via a gear wheel fastened to a shaft of the motor.

5. A device according to claim 2, wherein the planetary gear set includes planet wheels arranged on a planet-wheel carrier fixedly connected in terms of rotation to a housing of the planetary gear set.

6. A device according to claim 5, wherein a ring wheel of the planetary gear set is arranged to be freely rotatably in the housing.

7. A device according to claim 5, wherein the electric motor is in engagement with the ring wheel of the planetary gear set via a gear wheel fastened to a shaft of the motor.

8. A device according to claim 2, wherein the carrier forms a sun wheel of the planetary gear set.

9. A device according to claim 8, wherein a ring wheel of the planetary gear set is arranged to be freely rotatable in the housing.

10. A device according to claim 8, wherein the electric motor is in engagement with the ring wheel of the planetary gear set via a gear wheel fastened to a shaft of the motor.

11. A device according to claim 8, wherein the planetary gear set includes planet wheels arranged on a planet-wheel carrier fixedly connected in terms of rotation to a housing of the planetary gear set.

12. A device according to claim 11, wherein the electric motor is in engagement with the ring wheel of the planetary gear set via a gear wheel fastened to a shaft of the motor.

* * * * *